Figure 1:
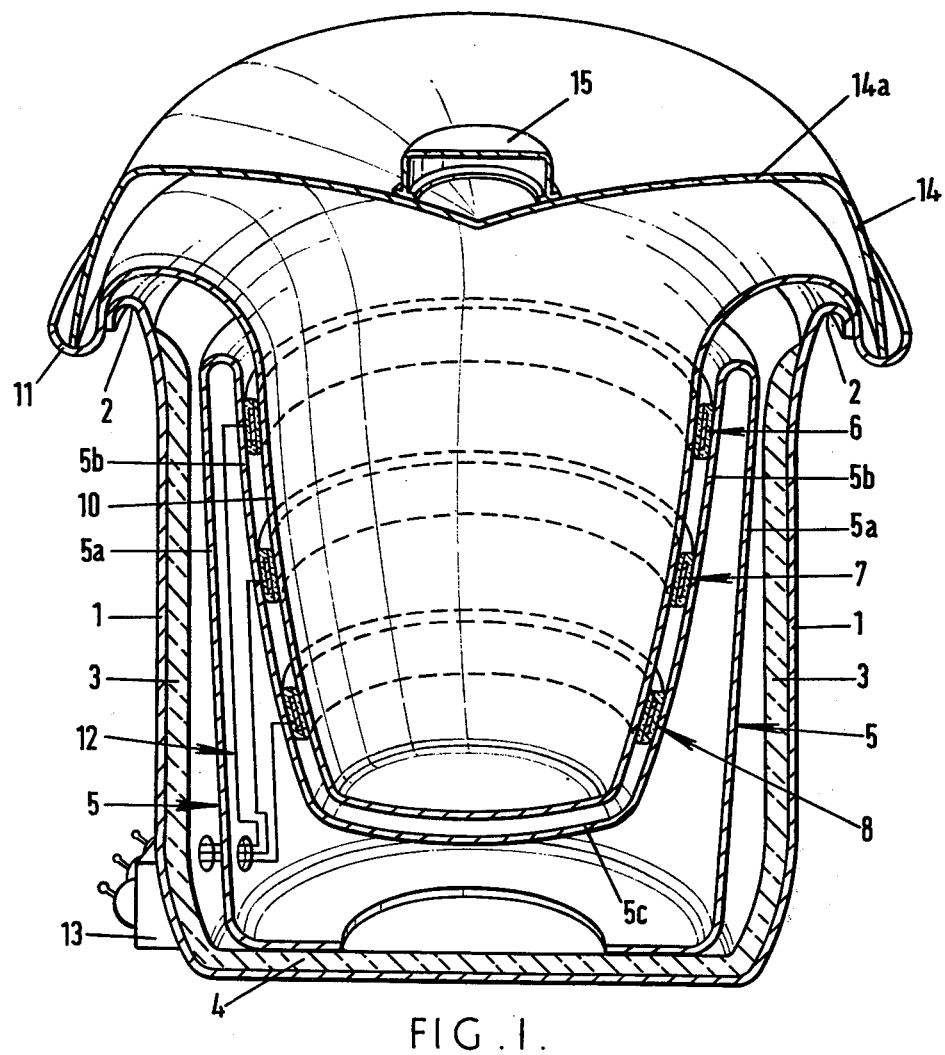

United States Patent [19]

Tupper

[11] 3,940,589

[45] Feb. 24, 1976

[54] PORTABLE COOKING EQUIPMENT

[75] Inventor: Earl Silas Tupper, Panama City, Panama

[73] Assignee: Tup! (Panama) S.A., Panama City, Panama

[22] Filed: Nov. 20, 1973

[21] Appl. No.: 417,583

Related U.S. Application Data

[63] Continuation-in-part of Ser. No. 311,545, Dec. 4, 1972, abandoned.

[30] Foreign Application Priority Data

Dec. 8, 1971 United Kingdom............... 57035/71

[52] U.S. Cl. ............... 219/433; 219/417; 219/432; 219/436; 219/441; 219/535
[51] Int. Cl.² ....................................... F27D 11/02
[58] Field of Search ........... 219/378, 408, 417, 422, 219/424, 426, 430, 431, 432, 433, 434, 435, 436, 437, 438, 439, 440, 441, 442, 456, 521, 522, 528, 535, 536, 537; 425/379 R

[56] References Cited

UNITED STATES PATENTS

| 680,266 | 8/1901 | McManns | 219/424 |
|---|---|---|---|
| 1,483,837 | 2/1924 | Scott | 219/408 X |
| 1,523,647 | 1/1925 | Imhoff | 219/424 |
| 1,730,042 | 10/1929 | Pendleton et al. | 219/417 |
| 1,825,406 | 9/1931 | Lipman | 219/417 X |
| 1,933,851 | 11/1933 | Granzer | 219/422 |
| 1,961,136 | 6/1934 | Cretors | 219/426 |
| 2,066,476 | 1/1937 | Lacy | 219/441 |
| 2,288,967 | 7/1942 | Challet | 219/456 |
| 2,572,695 | 10/1951 | Briscoe et al. | 219/433 |
| 2,836,851 | 6/1958 | Holt | 425/379 |
| 2,856,507 | 10/1958 | Naxon | 219/441 |
| 3,294,039 | 12/1966 | Ogden | 219/439 X |
| 3,484,585 | 12/1969 | Morey | 219/535 |
| 3,558,858 | 1/1971 | Luger, Jr. | 219/528 |
| 3,588,470 | 6/1971 | Husband | 219/378 |
| 3,772,500 | 11/1973 | Thibault | 219/535 |

FOREIGN PATENTS OR APPLICATIONS

| 563,027 | 9/1923 | France | 219/433 |
|---|---|---|---|
| 1,255,742 | 1/1961 | France | 219/433 |

Primary Examiner—Volodymyr Y. Mayewsky
Attorney, Agent, or Firm—Pollock, Vande Sande & Priddy

[57] ABSTRACT

A portable cooking installation consists of a heat-insulated enclosure containing a plurality of separately controllable electrical-resistance heating element surrounding and at least partially defining a space to receive a cooking vessel. For instance, two, three or four strip elements formed into circles of progressively increasing diameter (reckoning upwards) lie horizontally around a common axis to define a space to receive a suitably tapering cooking vessel; the elements can have aligned planar inner surfaces and be mounted on a resilient common support to improve vessel/element contact.

2 Claims, 2 Drawing Figures

U.S. Patent   Feb. 24, 1976   3,940,589

PORTABLE COOKING EQUIPMENT

This invention relates to cooking utensils and equipment and is a continuation-in-part of my earlier application Ser. No. 311545, filed Dec. 4, 1972, now abandoned and entitled "Cooking equipment."

Conventionally, cookery is done over a fixed source of heat in a kitchen. This is a very wasteful method of utilizing the heat available for cooking, and any extended cookery either renders conditions unpleasant in the kitchen or necessitates the use of additional equipment such as extractor fans. Moreover, it is customary to use a source of heat for cooking which is subdivided into a number of different types of applied heat, such as an oven, grill or broiler, or radiant hot plates. All of these are generally assembled in one piece of equipment, which is accordingly large and non-portable and must be permanently wired or piped in a fixed place.

The present invention sets out to overcome these disadvantages and in one major aspect provides a portable article of cooking equipment consisting of: an enclosure member, open at the top, comprising a surrounding wall formed of heat-insulating material and a base formed of heat-insulating material; a plurality of strip electrical resistance heating elements, formed into a series of like loop-shaped members of different sizes and being horizontally disposed and vertically sapced around a common vertical axis with the smallest such element at the bottom, thereby defining a space for receiving a cooking vessel resting by gravity against each element; electrical insulation means spacing said elements at least from said enclosure member; separate electrical connections, one to each heating element; and electrical switching means connected to said electrical connections whereby said heating elements can be selectively controlled.

In a preferred form of the invention (two-,three-,) or four-strip electrical resistance heating elements formed into circles of progressively decreasing diameter are held horizontally around a common axis within a heat-insulated enclosure so that the space within the heating elements may receive a cooking vessel or like utensil.

The heating elements may each be provided with a planar innermost surface, all said surfaces defining the space for receiving the cooking vessel.

All said elements may be mounted on a resilient support means to accommodate small deformations of fit between the elements and a cooking vessel held therein.

It is particularly advantageous that the heating elements are separately controllable.

No restriction need be placed upon the exact shape of the cooking vessel or like utensil although generally, since the object of the invention is to apply heat from essentially the sides of the vessel it will be shaped as a fairly deep saucepan. Needless to say, it is possible to provide an auxiliary heater beneath the base of the vessel, especially when the latter is relatively large. However, such auxiliary heater is not strictly necessary according to the invention.

It will be apparent that such a heat-insulated enclosure can be placed upon the dining room table itself, since it does not throw out a large amount of heat and damage the table or undesirably heat the room. Moreover, the use of heating elements surrounding the cooking vessel, especially when these are separately operable, leads to more efficient utilization of heat. Moreover, any heat reflected from the surface of the vessel (which in a conventional piece of equipment is reflected downwards) in the present equipment is reflected outwards so that it is absorbed by heat-insulated sides of the enclosure whereby heat insulation on the bottom need not be of an undesirable thickness. Another advantage of the equipment is that, because the heat is so effectively utilized, the power consumption of the equipment is much less than that of a conventional hot plate. This not only has the advantage of economy, but also obviates the need for a special wiring circuit to permit use of the equipment in a dining room, as distinct from a kitchen.

To cope with occasional spillage from the vessel, it is preferably to provide a trough-like annular rim on the cooking vessel. This rim is preferably integral with, but can be detachable from, the vessel and may itself be provided with suitable lifting handles so that the vessel may be removed from the space within the surrounding heating elements. Of course, a conventional lid can be provided for the cooking vessel, and/or an overall lid to stand in the annular rim so that in use the device is an acceptable feature of the dining table.

The surrounding enclosure may be of any shape, i.e., square or hexagonal, but is preferably circular in horizontal cross-section. It can be provided with the necessary switches for selecting one or more of the heating elements.

As will be apparent, the invention extends not only to the cooking equipment itself but also to the cooking equipment in combination with a suitable cooking vessel.

When the heating elements (if more than one is present) are selectively operable, it may be possible to use more than one different vessel in the same enclosure at different times. Generally speaking, however, it is envisaged to have a particular vessel and enclosure in combination. If desired, the cooking vessel may be a pressure cooker rather than a simple saucepan.

Figure 2:
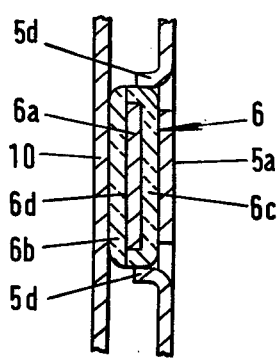

The invention will be further described with reference to the accompanying drawing, FIG. 1 of which shows a sectioned perspective view of a portable article of cooking equipment according to the invention, and FIG. 2 of which shows a scrap section of the heating element.

The equipment according to the invention consists of a generally cylindrical enclosure 1 having an outwardly and downwardly turned upper rim 2. Within this enclosure there is a layer of heat-insulating material 3 extending all around the curved wall and a bottom layer of heat-insulating material 4. Standing within the cylindrical enclosure is a resilient support member 5, generally cylindrical in shape, but formed with an outer wall 5a standing within enclosure 1, a resilient inner wall 5b and a base 5c. The inner wall 5b surrounds a generally conical space and supports heating element structures, generally referenced as 6, 7 and 8. Heating element structure 6 consists of a cylindrical electrical resistance heating element 6a with circular layers of insulating material 6b and 6c, the inner layer 6b having a planar innermost contact face 6d, and the outer layer 6c being held on the support wall 5b by stamped lugs 5d (see FIG. 2). Of course, elements 7 and 8 have similar structures to element 6. These heating elements jointly define a space suitable for receiving (in contact with the insulating layer 6b or, if the vessel is of electrically insulating material, possibly directly in contact with the elements, omitting such insulating layer) a cooking vessel 10 which is bent over at its rim to cover and fit against the downturned rim 2 of the enclosure 1 and to define an annular trough 11.

The various heating elements 6, 7 and 8 are separately connected by leads generally indicated at 12 to a control box 13 by means of which one or more heating elements may be selected depending upon the nature and amount of the material to be cooked in the cooking vessel.

The equipment is completed by a lid 14 which rests in the annular trough 11 and has a conventional handle 15. Lid 14 has a downwardly sloping inner surface 14a.

The dotted lines show that the elements 6, 7 and 8 completely surround the vessel.

In use the cooking vessel not only stands within the various elements 6, 7 and 8 but rests against them to assure effective heat transfer, since the planar contact face 6d and like planar faces in element structures 7 and 8 define the enclosed space accurately while the resilient support 5 accommodates any small deformations to the extent necessary.

It is also envisaged that the heating elements can be attached to the support member 5b by additional ceramic or other refractory lugs or clips, provided that such attaching devices not affect the desired contact between the cooking vessel and the elements 6, 7 and 8. This requirement will present no difficulty to the man skilled in the art, whether the support member 5 be made of metal or of electrically non-conductive material.

Alternatively, and especially where the support member is made of metal, the elements can be covered with insulating material such as asbestos, and attached directly to the support member.

Of course, the equipment shown in the drawings is capable of wide variation within the scope of the invention, provided that at least one surrounding heating element within the insulated enclosure defines a space to receive the cooking vessel 10. Thus, the cooking vessel can be a pressure cooker, the surrounding annular rim can be detachable from the pot or be dispensed with altogether if there is no danger of spillage, and/or lifting handles can be provided (e.g., recessed into the walls of the cooking pot) instead of the lifting arrangement with the annular rim. Also, the surrounding enclosure can be of any desired cross-section and appearance, and may be provided with decorative or instructional panels on its outer surface. If desired, and to improve heat insulation, spacing feet may be provided on the base of the enclosure to support it clear of, for example, a dining-room table.

I claim:

1. A portable article of cooking equipment consisting of: an enclosure member, open at the top and comprising a surrounding wall formed of heat-insulating material and a base formed of heat-insulating material: a resilient support member within said enclosure member and having an internal wall portion defining an inner chamber open at the top and of decreasing cross-section from top to bottom, and a resilient support for said internal wall portion, said internal wall portion being spaced from said surrounding wall and from said base of said enclosure member; a plurality of strip electrical-resistance heating elements formed into a series of like loop-shaped members supported on the inner surface of said internal wall portion in a horizontal disposition and vertically spaced one from the other, thereby defining a space for receiving a cooking vessel resting by gravity against each element; resilient support means on said internal wall portion, said elements being mounted on said resilient support means to accommodate small deformations of fit between the elements and a cooking vessel held therein; electrical insulation means spacing said elements at least from said internal wall portion; separate electrically insulating electrical connections, one for each heating element; and electrical switching means mounted to the outer wall of said enclosure member and connected to said electrical connections, whereby said heating elements can be selectively controlled.

2. A portable article of cooking equipment as claimed in claim 1 wherein said heating elements are each provided with a planar innermost surface, all said surfaces defining the space for receiving the cooking vessel.

* * * * *